United States Patent [19]
Gerhaher

[11] Patent Number: 5,594,416
[45] Date of Patent: Jan. 14, 1997

[54] DECELERATION WARNING SYSTEM

[76] Inventor: Max Gerhaher, Dr.-Aicher-Str. 3, 94405 Landau/Isar, Germany

[21] Appl. No.: 561,206

[22] Filed: Nov. 20, 1995

Related U.S. Application Data

[63] Continuation of Ser. No. 199,048, Feb. 18, 1994, abandoned.

[30] Foreign Application Priority Data

Feb. 19, 1993 [DE] Germany ........................... 43 05 186.3

[51] Int. Cl.$^6$ .................................................. B60Q 1/50
[52] U.S. Cl. ...................... 340/467; 307/10.8; 340/464; 340/479
[58] Field of Search ..................... 340/467, 464, 340/479, 903, 435; 307/10.8

[56] References Cited

U.S. PATENT DOCUMENTS

| | | | |
|---|---|---|---|
| 4,320,384 | 3/1982 | Carlson | 340/467 |
| 4,600,913 | 7/1986 | Caine | 340/435 |
| 4,663,609 | 5/1987 | Rosario . | |
| 4,800,377 | 1/1989 | Slade | 340/467 |
| 4,833,469 | 5/1989 | David | 340/435 |
| 5,017,904 | 5/1991 | Browne et al. | 340/479 |
| 5,150,098 | 9/1992 | Rakow | 340/464 |

FOREIGN PATENT DOCUMENTS

| | | |
|---|---|---|
| 0380736 | 8/1990 | European Pat. Off. . |
| 0453601 | 10/1991 | European Pat. Off. . |
| 4014916 | 11/1991 | Germany . |
| 2213658 | 8/1989 | United Kingdom ................. 340/467 |
| 2239701 | 1/1990 | United Kingdom . |
| WO9117068 | 11/1991 | WIPO . |
| 9221116 | 11/1992 | WIPO ................................. 340/903 |

*Primary Examiner*—Brent A. Swarthout
*Attorney, Agent, or Firm*—Morgan & Finnegan LLP

[57] ABSTRACT

A deceleration warning unit and a method for the control thereof serve for reducing the danger of rear end collisions in road traffic or in other movements of bodies. In order to avoid the disadvantages of conventional brake lights and warning blinking systems the intensity of the warning by the deceleration warning system of a vehicle ahead is made dependent on the level of the danger factor G, which applied for such vehicle and may be relevant for the following vehicle.

23 Claims, 4 Drawing Sheets

DECELERATION WARNING SYSTEM

This is a continuation of application Ser. No. 08/199,048, filed on Feb. 18, 1994, and now abandoned.

FIELD OF THE INVENTION

The invention relates to a system and a method for the control thereof, by means of which the danger of rear end collisions in road traffic may be reduced.

BACKGROUND OF THE INVENTION

The deaths and injuries and furthermore damage to property caused by traffic accidents are to a substantial extent due to rear end crashes. It is to be admitted that in the last decades great progress has been made for the further development of passive protection against accidents, by which the consequences of accidents are reduced. In this respect it is only necessary to think of crumple zones, seat belts, head rests and airbags.

The development of brake lights which became known in the twenties has however hardly led to any significant step forward. Brake lights have only become brighter and somewhat larger and are turned on as soon as the brake pedal is moved a certain amount even without slowing down the vehicle. In the USA a center-mounted third brake light has recently been introduced.

The substantial disadvantages of known brake lights have however not been overcome by such improvements. Brake lights only shine on actuation of the foot brake and not whenever the vehicle coasts along, that is to say on deceleration because the driver takes his foot off the accelerator pedal or owing to switching on an additional engine or eddy current brake and furthermore not owing to the braking effect of the air. Such causes may lead to a deceleration both at a high speed (mostly owing to the resistance of the air) and at a low speed (mostly owing to the motor brake torque) of approximately 1.5 to 2 m/sec$^2$. In the case of an unloaded truck simultaneous operation of the engine brake and an eddy current brake may lead to deceleration values of even up to 3 m/sec$^2$, this all taking place without operating the light. Such deceleration is as such equal to 15 to 30% of an emergency braking effect under dry road conditions and approximately 50 to 100% of the deceleration during emergency braking on a snow covered road surface. Therefore even by removing one's foot from the accelerator pedal for a time of several seconds a speed differential in relation to the vehicle behind is established, which involves the danger of a rear end collision without the brake light being turned on. This is something which has special serious effect in all those cases in which the actual braking operation (with the brake light) is preceded by an extended coasting phase (without the brake light). It is specially that when a sufficient safety distance is maintained that the deceleration without the brake light turned on which is hardly noticed by the eye, since at a considerable distance three-dimensional vision is practically non-existent. Furthermore the optical effect of an object becoming larger (that is to say in the case of the vehicle in front) on drawing closer is at a minimum at a great distance apart, and since for instance in the case of a distance of 100 meters drawing closer by 10 meters only causes an increase in apparent size of 11%: in the case of a distance of 20 meters drawing closer by 10 meters will practically double the apparent size of the preceding vehicle.

Owing to absence of early warning valuable time is "squandered" at the start of the required braking of the following vehicle, since the braking path "wasted" is much longer at high speed. An early warning effect for great distances is however now way achieved by a conventional brake light.

A further disadvantage of a customary brake light is due to the fact that the warning caused by the light being turned only continues as long as braking is taking place or, respectively, the brake pedal is depressed. However by no longer braking the danger of a rear end collision is not banished, since the speed differential in relation to the following vehicle owing to the braking operation is still present. On being turned off the brake light creates the erroneous impression in fact that the danger no longer exists.

A further disadvantageous effect is that the intensity of the warning in the case of conventional brake lights is independent from the degree of the braking deceleration. This may on the one hand be responsible for a panic reaction (for example sharp braking without the safety distance being sufficient) and accordingly for an effect causing an accident: on the other hand there is however not the sufficiently increased intensity of the warning, which would for instance be necessary in the case of emergency braking with a high deceleration effect.

For around 20 years the so-called warning blinking system has been prescribed by law (in Germany). In this respect it is a question of a manual switching on of all four direction indicators, which are then turned on and turned off synchronously. Operation is prescribed for securing stationary vehicles on high speed roads (for example in a traffic jam) or when a vehicle is being towed away. It is more or less a question of a permanently turned on braking light which has proved highly successful in practice, since it will be turned on by an experienced driver on high speed roads just when he sees a jam or an accident from a distance. The disadvantage of a warning blinking system is however that it must be operated by hand and specially in the case of emergency braking, that is to say a particularly serious danger, there is no time for its operation and the driver should not have his attention diverted by having to operate additional equipment. Even after a rear end collision many drivers are shocked or physically injured and not in a position to switch on the warning blinking system.

Many experienced drivers warn the following traffic by intermittently braking and by intermittent operation of the brake lights (if the brake pedal is eased off sufficiently). This method does however suffer from the substantial disadvantage that it is only applicable in the case of a low braking deceleration and a sufficiently long time, and is not however applicable if there is a real danger to be feared and a powerful braking action is called for.

A further development, which has been subject to much developmental work without however producing any substantial success, is proximity radar, which when the following vehicle does not keep to the required safety distance, an optical or acoustic signal is produced in such following vehicle or even an action is produced automatically braking the following vehicle. The disadvantages of proximity radar are manifold and are to be explained briefly as follows: an acoustic or optical warning (on the dashboard) is likely to be a distraction instead of an attraction of the attention in a reasonable manner, since it does not come from a point which is a source of the danger, i.e. the preceding vehicle, Furthermore such a radar system does not react to a speed differential, which is particularly dangerous, but rather only to a failure to maintain the safety distance. A further disadvantage is to be seen in the fact that the driver is much too frequently warned, that is to say for example even when a vehicle coming into his lane from another lane comes within the safety clearance or distance; in this case no additional warning is required, since the process of changing a lane is conspicuous and will be noticed even by a driver who is not particularly attentive. Furthermore an automatic application of the brakes or causing the engine to deliver less power by such proximity radar would be such an interference with driving that in many cases it might even be the cause of an accident.

Of recent times a suggestion has been made to cause a removal of the driver's foot from the accelerator pedal to turn on an orange "brake light" as a preliminary warning preceding the actual, red braking light. The advantage would then be that even deceleration due to dropping power would be indicated and if there were an immediately following braking operation the reaction time would be reduced by the time required for shifting one's foot to the brake pedal, i.e. a matter of some tenths of a second. The disadvantage of this system is that it responds to every removal of the driver's foot from the accelerator pedal, be it ever so short, and reduces the awareness of the following driver owing to too many events takings place simultaneously. Furthermore this circuit means that the number of rear end collisions is likely to be increased, since the braking operation as such turning on the red light is now not sufficiently distinct.

In a further development work has been aimed at shortening the response time of the brake lights, which normally amounts to 0.20 to 0.25 sec. This may be performed, for instance, by preheating the lamp filament with a low current or by the employment of LED's instead of incandescent lamps. In either case the response time may be shortened by around 0.10 to 0.15 sec, admittedly only a small step forward, since the braking distance at a speed of for instance 100 km/h is decreased by 3 to 4.5 meters and at 150 km/h is decreased proportionally thereto by 4.5 to almost 7 meters, The above described basic disadvantages of conventional brake lights are however not reduced or even overcome.

One object of the invention is consequently to provide a deceleration warning system and a method for the operation thereof, by which the danger of rear end collisions in road traffic or other movements is reduced and by which the disadvantages of the conventional brake lights and of warning blinking systems are prevented or reduced.

SUMMARY OF THE INVENTION

In accordance with the invention this object is to be achieved by the features of claim 1 herein. The deceleration warning system is in this case so controlled that the intensity of warning is, in accordance with certain functions, dependent on the level of the danger factor G, which is a function of the vehicle, in which the system is installed and may become effective for the following vehicles. Owing to the dependency of the intensity of the warning on the level of the danger factor it is possible to ensure that the driver of the following vehicle is particularly intensively warned if the danger of a rear end collision is extreme, whereas in the case of non-critical state his attention is not excessively distracted in order to not to cause fatigue or an inappropriate reaction. In this respect the deceleration warning system should not only respond in the case of deceleration caused by actuating the foot brake but furthermore to deceleration due to other causes such as deceleration caused by using the engine as a brake or using an eddy current brake or by the driver's taking his foot from the accelerator pedal. It is an advantage that the deceleration warning system only responds when deceleration has exceeded a relatively low value of for example 0.5 m/sec$^2$. The warning system does not respond to values under this figure so that the warning system is not excessively frequently operated.

Advantageous furthermore developments of the invention are recited in the dependent claims.

DETAILED DESCRIPTION OF THE INVENTION

Preferably the deceleration Warning system comprises two or more deceleration lights instead of conventional brake lights, which when a predetermined furthermore limit value for deceleration of for instance 0.5 m/sec$^2$ is reached, start blinking. This offers the advantage that the following vehicle is more intensively warned as soon as the preceding vehicle is strongly braked.

It is more particularly advantageous in this respect if the level of the overall danger factor $\Sigma G$ is determined, from the, mean deceleration and the time of the deceleration and/or the deceleration distance , since even a relatively slowing braking down from a high speed for a long period of time or a long deceleration distance until a very low speed is reached or even till the vehicle is stationary may lead to high overall danger factors. This is something which will particularly clear in the case of low traffic density and great distances between vehicles on a high speed road, since the deceleration of the preceding vehicle is likely to be overlooked owing to the great distance between the vehicles. In the case of small distances apart on the other hand the reduction in the distance is detected very much more clearly by three-dimensional vision and by the rapid optical enlargement of the preceding vehicle.

It is convenient if instead of the mean deceleration the respectively variable deceleration b is integrated over the time t or the deceleration distances in accordance with a certain function, as for instance using the following equation:

$$\Sigma G_1 = \int_0^t b \, dt$$

Since however in accordance with the equation $$s = \frac{v^2}{2b}$$

with an increased deceleration the braking path or distances varies in a manner inversely proportional to the deceleration, the danger for the following vehicle is simultaneously increased.

In accordance with the equation $$G_1 = \int_0^t b \, dt$$

this is however is not taken into account, since in the case of an inversely proportional change in b and t (in accordance with the equation t–v : b) maintains the same value. It is convenient consequently for the determination of the integrated overall danger factor $G_2$ for the respective deceleration to be taken into account to an enhanced degree. This may be performed if for instance the value of the braking deceleration is raised to a certain power. If the deceleration is raised to the power of two, then on an increase in the between deceleration the overall danger factor $\Sigma G_2$ will be increased in a manner inversely proportional to the length of the braking distance as follows:

$$\Sigma G_2 = \int_0^1 b^2 dt$$

Furthermore it is however possible for instance to take into account the variation in time t, decreased for example by √t instead of the enhanced allowance for deceleration by $b^2$, this leading to a similar effect. It is obviously possible to take into account the deceleration or the time put to another power: this is however more a matter of empirical optimization.

It is a matter of experience that the degree of hazard increases with the speed, at which rear end collision occur. Thus if a vehicle crashes against a stationary vehicle (having the same mass) at a speed of for example 30 km/h, the stationary vehicle will, dependent on the deformation, conversion of energy and residual energy, be accelerated somewhat, but may be readily braked again (if it is not in any case thrust against a vehicle in front of it). The vehicle causing the crash will also come to halt owing to the accident with the result that, apart from further possible rear end collisions, the accident will be concluded. If however the rear end collision takes place at an equal speed difference of for example 30 km/h at a speed of for example 150 km/h in the case of the preceding vehicle and 180 km/h in the case of the following vehicle, then although the damage caused by the rear end collision is generally the same as in a collision against a stationary vehicle, since the converted energy is proportional to the square of the difference in speed before and after the crash, however as a rule at such a high speed the two vehicles will go into a skid as a consequence of the impact or owing to effects of injury and/or shock on the reactions of the drivers with the result that an inherently relatively harmless rear end collision may well be the cause of one or more ensuing substantially more serious ones.

There a further reason for a substantial increase in the danger due to the preceding vehicle at a high speed: the braking distance in fact increases with the square of the speed at which the vehicle is traveling. The value of "half the speedometer reading" recommended (in Germany) by law is consequently only sufficient if the preceding vehicle is also braked down using the operational brake and therefore under generally the same conditions. If on the contrary a preceding vehicle runs up against a stationary obstacle so that it is abruptly stopped with a braking distance equal to zero, then taking into account a certain reaction time a following vehicle moving at the same speed can only be braked at relatively low speeds without a rear end collision.

1st example: speed of both vehicles $v_0$=50 km/h=13.9 m/sec; distance apart a=½v=25 meters; crash of the first vehicle against a stationary obstacle; reaction time t=1 sec. and maximum braking deceleration b–8.7 m/sec² (on a dry road):

| | |
|---|---|
| Reaction distance | $s_1 = v_o \times t = 13.9 \times 1 = 13.9$ m: |
| Residual braking distance | $s_2 = a - s_1 = 25 - 13.1 = 11.1$ m; |
| Speed differential | $\Delta v = \sqrt{(2\ b\ s)} = \sqrt{(2 \times 8.7 \times 11.1)} =$ 13.9 m/sec = 50 km/h |
| Impact speed | $v_A = v_o - \Delta v = 50 - 50 = 0$ km/h |

If full advantage is taken of the possible braking deceleration the residual braking distance of 11.1 meters will just be sufficient in order to slow down the following vehicle from 50 km/h without a rear end collision.

2nd example: $v_o$=100 km/h=27.8 m/sec; a=½v–50 m; t=1 sec; b=8.7 m/sec².

| | |
|---|---|
| Reaction distance | $s_1 = v_o \times t = 27.8 \times 1 = 27.8$ m: |
| Residual braking distance | $s_2 = a - s_1 = 50 - 27.8 = 22.2$ m; |
| Speed differential | $\Delta v = \sqrt{(2\ b\ s)} = \sqrt{(2 \times 8.7 \times 22.2)} =$ 19.7 m/sec = 71 km/h |
| Impact speed | $v_A = v_o - \Delta v = 100 - 71 = 29$ km/h |

Given the same reaction time and the same braking deceleration as in the first example then despite keeping to the prescribed safety distance there will be a rear end collision with a crash speed of 29 km/h. It is naturally convenient in the case of a sequence of individual deceleration events taking place in rapid succession, as for instance $b_A$, $b_B$, $b_C$, to determine the sum of the danger factors, for instance $\Sigma\Sigma G = \Sigma G_A + \Sigma G_B + \Sigma B_C$.

In the case of a $v_o$ value of 150 km/h there will still be a crash speed of 63 km/h and at a $v_o$ value of 200 km/h there will be a crash speed of 100 km/h.

In the case of a particularly advantageous form of the warning blinking system in accordance with the invention consequently for determining the overall danger factor $\Sigma G$ the speed $V_9$ at which the vehicle was moving prior to the crash is taken into account. If in this respect the initial speed $v_o$ expressed in m/sec is employed, then with an exponent between 1.8 and 2.2 the same will effectively be taken into account, for example:

$$\Sigma G_3 = v_o^2 + \int_0^t b^2 dt$$

In the case of a further possible form of the invention on the contrary for the determination of the overall danger factor the speed $v_0$ at which a vehicle is moving is taken into account as a factor. This offers the advantage of particular simplicity, since the overall danger factor $G_4$ is proportional to the initial speed $v_o$, for instance:

$$\Sigma G_4 = v_0 x \int_0^t b^2 dt$$

If a braking operation is constituted by a plurality of individual or compound deceleration stages, then $v_o$ is conveniently assumed to be the speed prior to the first braking stage.

In the case of another advantageous embodiment of the invention the road condition, that is to say the coefficient of friction, is taken into account. The examples 1 to 3 are in fact only applicable for dry and high friction road surfaces, on which high braking deceleration (here for example of 8.7 m/sec²) may be expected. The necessary braking distance is in fact inversely proportional to the coefficient of friction and hence to the maximum possible braking deceleration. Assuming that the road surface is wet and there is a maximum possible braking deceleration of for example 5 m/sec², the impact speeds will be increased in a manner similar to the above example considerably; as will be seen from the following table.

| At $v_o = 50$ km/h | $v_A = 12$ km/h |
|---|---|
| at $v_o = 100$ km/h | $v_A = 46$ km/h |
| at $v_o = 150$ km/h | $v_A = 84$ km/h |
| at $v_o = 200$ km/h | $v_A = 124$ km/h |

This is something which is particularly serious for instance in the case of an iced road surface with a possible braking deceleration of for example 1 m/sec²; in this case the impact speeds are increased to extreme value: at $v_o$=50 km/h $v_A$ will be 33 km/h and at $v_o$=100 km/h $v_A$ will 76 km/h.

In an improved embodiment of the invention the road condition is taken into account during operation of the anti-wheel lock system and the integrated overall danger factor is additionally increased. This may for example be by a factor, which is equal to the reciprocal of the mean brake pressure of all brake cylinders. The hydraulic braking pressure is in fact approximately proportional to the braking deceleration. If in fact owing to the low coefficient of friction (between tires and the road) only a low braking pressure becomes established before the anti-wheel lock system responds, this will be a sign that braking deceleration is being used to the full possible extent. Taking into account the mean braking pressure offers in this respect the advantage that the response of the anti-wheel lock system on only one wheel or on the wheels on only one side is not considered to have an excessive significance.

In the case of a further improved embodiment of the invention the increased danger of a rear end collision is taken into account. Owing to the arrangement of a proximity radar unit directed towards the rear it is possible for the overall danger factor to be gone below by half the speedometer reading. By the installation of proximity radar directed towards the rear it is possible for the overall danger factor to be additionally increased by an amount equal to the degree to which a certain minimum distance, which is dependent on the advantage and is equal to for instance half the speedometer reading, is gone below. This may be achieved for instance by multiplication of the overall danger factor by the factor $v_o/s$ or for instance, to an increased extent, the factor $(v_o/s)^2$. The invention is that at an increased speed the integrated overall danger factor is increased in a manner which is proportional or over-proportional to the speed, as is in fact the case in reality. Furthermore this means that the overall danger factor is changed in a way which is proportional or over-proportional to the safety distance.

A condition of the possibility of employing the overall danger factor (and of the partial danger values) is a continuous detection of the relevant data, more particularly of the speed, deceleration (or acceleration), the time, the operation of the anti-wheel lock system, the braking pressure and of the distance from the following vehicle and furthermore the processing of the data to yield overall danger factors, integration and calculation of the overall danger factor, storage thereof and furthermore continuous updating of the data by continuous storage and cancellation of further data. The measurement of the speed and time is preferably performed electronically using state of the art methods. For the measurement of brake deceleration and acceleration recently relatively inexpensive electronic equipment has become available; the monitoring of the anti-wheel lock system may be directly performed using the anti-wheel lock system control device itself and for the measurement of the distance from the following vehicle familiar proximity radar is available. The processing of the readings for the determination of the partial danger values ΔG and of the respective anti-wheel lock system ΣG is performed in accordance with the desired and empirically optimized functions in a computer. This computer furthermore performs the updating of the data or condition very rapidly with the logged input data which are subject to rapid changes. The significant point is that besides a reasonable linking of the individual data with respect to the above mentioned functions as an overall danger factor ΣG, more especially there should be a reasonable updating of the overall danger factor.

This is performed in accordance with the invention since for each deceleration and at least in the case of a deceleration above a certain minimum value the respective overall danger factor ΣG is ascertained and integrated to yield the respectively current overall danger factor ΣG and stored in the computer. The level of the respectively stored current overall danger factor is then significant for the intensity of the warning for the driver of the following vehicle by the deceleration warning light. This leads to the significant advantage that a warning is produced as long as an overall danger factor is stored. The intensity of the warning is conveniently coupled to be a certain function of the level of the stored overall danger factor. Switching off possible warning consequently takes place not as so far customary by the driver's taking his foot off the brake pedal so that the brake light was simultaneously turned off, although the differential speed produced by braking and the danger still existed. In fact owing to the storage of the overall danger factor the deceleration warning system remained in operation so that the danger still present was complied with by producing a suitable warning.

However in order for the intensity of the warning to be reduced when there is less danger in the case of deceleration warning system acceleration of the vehicle also taken into account, because in fact acceleration of the vehicle following a braking operation the danger of a rear end collision is reduced again. Since in the case of acceleration it is a question of a negative acceleration, the data processing preferably takes place in the computer in accordance with the same functions so that in the case of an acceleration of the vehicle by integration of negative partial danger values −ΔG there is bit by bit a cancellation of the stored overall danger factor ΣG. Preferably there should be a provision in this respect to see that no negative overall danger factor may be stored, since a moving vehicle always involves a positive danger in other respects, for instance during braking a vehicle which has just started moving the warning effect would be suppressed by a negative stored overall danger factor, something which would tend to make the danger greater.

In the case of a further advantageous embodiment of the system in accordance with the invention there is also a cancellation of the stored overall danger factor owing to elapse of time. This may be performed either quite simply by a time-dependent cancellation of the stored value in constant steps. Preferably however the time for the cancellation is measured with reference to the level of the stored overall danger factor or, respectively, during cancellation with reference to the level of the residual value. This leads to the advantage that for instance after braking a vehicle moving at a low speed the subsequent warning time is, owing to rapid cancellation, very much shorter than after braking a vehicle moving at a high speed with the result that the increased danger on a high speed road is taken into account. In the case of heavy braking as well the danger factor and therefore the subsequent warning time are increased owing to taking the braking deceleration into account.

This is something which is particularly significant in the case of rear end collisions (which will still occur despite the introduction of the warning system in accordance with the invention, although the number thereof will be reduced and the form thereof less serious), since owing to the extremely high deceleration during impact the overall danger factor in the computer of the vehicle crashing against an obstacle will be extremely increased. This means that, independently of whether it is question of a braked or unbraked rear end collision, there is immediately an operation in the most intensive stage of the warning means with a very long subsequent warning time.

The cancellation duration of the stored overall danger factor may be programmed in such a manner, for instance, that it is proportional to the level of the overall danger factor or, respectively, proportional to the level of the residual danger factor. There is then a constant rate of cancellation.

In order to aid clarity some important examples of various possible cases will be considered.

$$\Sigma G = \int_0^t b^2 dt$$

Assumptions:

| | |
|---|---|
| $b_1$ = constant = 1 m/sec² | (for instance allowing vehicle to slow down without braking) |
| $b_2$ = constant = 8 m/sec² | (emergency braking) |
| $b_3$ = 10 to 450 m/sec² | (rear end collision) |
| t being the time in seconds. | |
| $v_oA$ = 60 m/sec | Autobahn, 216 km/h |
| $v_oB$ = 30 m/sec | highway, 108 km/h |
| $v_oS$ = 10 m/sec | city traffic, 36 km/h |
| $v_oK$ = 1 m/sec | crawling traffic, 3.6 km/h |

Slowing down from $v_o$ to stationary.

If for example a period of warning (in seconds), which corresponds to the respective residual numerical value of the $\Sigma G$ (in m²/sec³) is selected, then there will be generally the following subsequent warning times (without taking into account the warning time during the deceleration).

| Speed $v_o$ in km/h | Stored danger value: here numerical comparison with the | | | | |
|---|---|---|---|---|---|
| | subsequent warning time ($b_1$) at 1 m/sec² | subsequent warning time ($b_2$) at 8 m/sec² | | subsequent warning time ($b_3$) with rear end collision | |
| Autobahn 216 km/h | 60 sec. | 500 sec | = 8 min | 25,000 sec | = 400 min |
| Highway 108 km/h | 30 sec | 250 sec | = 4 min | 6000 sec | = 100 min |
| City traffic 30 km/h | 10 sec | 80 sec | = 1.3 min | 600 sec | = 101 min |
| Traffic at crawl 3.6 km/h | 1 sec | 8 | = 0.1 min | 6 | = 0.1 min |

It may naturally be expedient to empirically optimize these warning times and to adapt them using other functions. After the respective time the warning device switches itself off completely after it has previously warned in accordance with the decreasing level of the residual danger factor still stored with a declining intensity.

The cancellation of the stored overall danger factor by elapse of time may however in principle take place in accordance with other functions: this is only a question of the theoretical and empirical optimization.

In accordance with a convenient embodiment of the invention the respective rate of cancellation is measured with respect to the still stored overall danger factor so that the cancellation take place extremely rapidly at the start and with a decrease in the residual value does not occur linearly but only asymptotically. The advantage is to be seen in that in the case of a vehicle which remains stationary after a crash the warning function is maintained without any limitation as to time even although the level declines.

Furthermore a simple limitation of cancellation in the case of a minimum residual danger factor is possible; this form of the invention offers the advantage that warning of danger occurs, after the residual factor is attained, with a minimum intensity.

It is furthermore possible to interrupt the cancellation in a fashion dependent on the speed of the vehicle or dependent on a speed-related minimum distance from the following vehicle. This involves the advantage that in the case of deceleration or braking it is unnecessary for the overall danger factor to be produced starting at zero, and is stored from the beginning as in the present working example of the invention the latent danger represented by speed and/or an excessively low safety distance between vehicles.

In the case of the embodiment of the invention described it is possible for the warning function to be switched off on achieving the above mentioned residual values. It is however also possible not to have an interruption of the warning function and even to start warning firstly with less intensity and then with increasing intensity in accordance with the degree to which a following vehicle fails to maintain the speed-related safety distance.

In accordance with a further advantageous development of the invention cancellation is interrupted as long as positive residual danger factors are stored; this excludes the possibility of an undesired effect on storage and cancellation and renders possible a more rapid storage of the necessary danger factors.

Another advantageous form of the invention is such that cancellation owing to elapse of time continues as long as values able to be canceled are stored—that is to say during the phase of deceleration. In this respect however the cancellation owing to elapse of time must take place, as in all other cases, significantly more slowly than storage by allowing the vehicle to run to a halt, since otherwise the in this case the positive partial danger factors would be compensated for by cancellation of equal size, although there would be an increasing danger owing to the resulting speed difference. In the case of the examples in the last preceding table herein there is in fact in the case of deceleration of 1 m/sec$^2$ in each of the four cited cases storage is exactly completed in this period of time, which is the same as the subsequent warning time. In the case of the relatively low deceleration of 1 m/sec$^2$ there would be consequently no establishment of a danger factor with simultaneous cancellation owing to elapse of time in the storage memory. In this case the deceleration of 1 m/sec$^2$ would be the lowest threshold, at which the system starts operating. From this consideration it may be seen that either cancellation has to be completely interrupted or the speed of cancellation during storage must be limited at least to a fraction of the rate of storage in the memory.

By control using a different function (slower cancellation) or in the case of switching off cancellation during storage to memory it is consequently possible for the lowest threshold of deceleration at which storage takes place, to be set at a much lower level as for example at a deceleration of 0.5 m/sec$^2$. This threshold value may however also be programmed for in a fashion dependent on the speed and/or the mean brake pressure on response of the anti-wheel lock system. This is something which offers the advantage that even in the case of iced roads it is significantly below the deceleration, which is then extremely low, of for instance merely 0.5 m/sec$^2$.

As regards warning the driver of the following vehicle, the design in accordance with the invention makes the intensity of warning dependent on the level danger of a possible rear end collision. This is something, as already described above, which is possible by determination and storage of a respectively current overall danger factor, whose instantaneous level is the respective measure for the intensity of warning.

As already described the warning is preferably provided by one or more blinking warning lights. Unlike known technology the operation of the blinking warning lights is not something only performed by operation of the brake pedal and it is caused simply by deceleration as soon as a certain threshold danger factor has been reached. In the case of an advantageous embodiment of the invention the threshold danger factor is additionally dependent on the mean brake pressure on response of the anti-wheel lock system so that for example in a danger situation on an iced road there will be a substantially earlier warning than is the case with normal condition of the roads.

This threshold factor has to be very much lower in order to prevent minor rear end collisions at low speeds. In the case of an advantageous embodiment of the warning device the threshold through factor is programmed to be speed-dependent in order to prevent excessive psychological stimuli in traffic situations, in which it is a question of primarily preventing serious and extremely serious rear end collisions between vehicles which before the crash were at a substantial distance from one another with a high speed differential. In the case of one advantageous embodiment of the invention the threshold danger factor is made additionally dependent on the mean brake pressure on response of the anti-wheel lock system so that for example in a dangerous situation on an iced road there is a substantially earlier operation of the warning system than in the case of normal road conditions.

DESCRIPTION OF THE FIGURES

Figure 1:
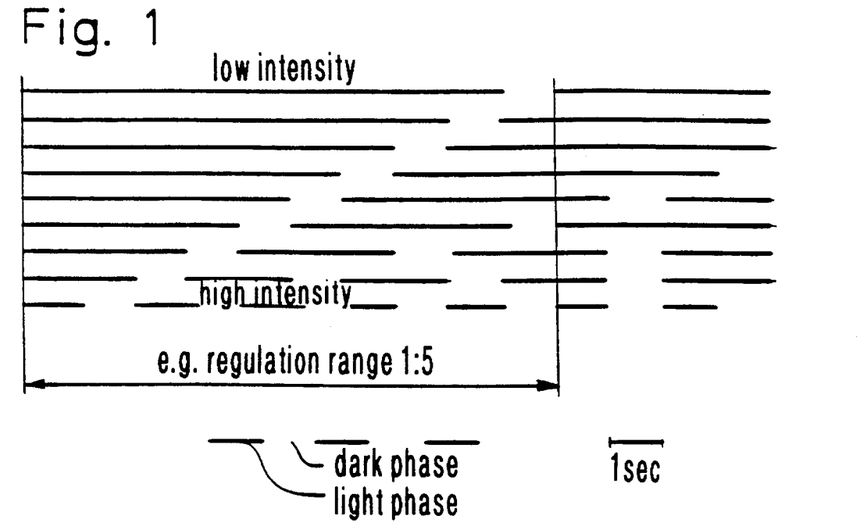
FIG. 1 shows a blinking profile with long light phases and short constant pauses and furthermore an increasing frequency.

In accordance with the invention furthermore, dependent on the level of the stored overall danger factor, the duration of blinking and the frequency thereof and consequently the intensity of the warning given is varied. In this respect there are several possibilities:

In the case of a first possible design the deceleration warning light is switched when the overall danger factor is gone below. On increasing the overall danger factor there is, at short intervals, a short interruption (switching off of the warning light). When there is a further increase in the overall danger factor the interruptions of equal length take place with increasingly shorter time between them, as is illustrated in FIG. 1 hereof. The pauses have for instance a duration of one second; a satisfactory value in practice has to be set by empirical optimization. The maximum practical intensity is in this case on the one hand limited technically by the rate of cooling and heating up of the lamp and on the other hand it is limited physiologically since excessively rapid blinking appears to be as a continuous lighting effect and does not increase intensity of warning. The advantage of this form of the invention is that it is closely related to a conventional brake light and that a relatively large range of variation for control of for instance 1:5 is possible, since there are no long pauses. The disadvantage is that continuous light, which is caused by even a low deceleration, as has so far been the case, at once causes a substantial warning effect without its being necessary; this means that an extremely small warning blinking effect is not possible.

Figure 2:
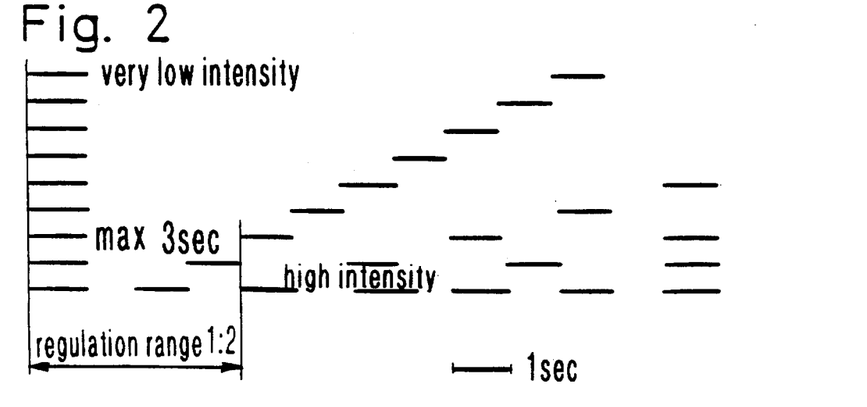
FIG. 2 shows a blinking profile with short constant light phases and long variable pauses and with an increasing frequency.

In the case of the second embodiment of the invention, whose characteristics are illustrated in FIG. 2, the deceleration which light blinks on going below the limit value one short time, for example for one second, this being followed by a longer pause. If there is an increase in the overall danger factor the pauses then become shorter between the shining phases of constant light as long as the light phase and the pauses are of approximately equal duration. The advantage of this embodiment of the invention is that the intensity of warning is also suitably low in the case of a low overall danger factor owing to short blinking. This is on the one hand an advantage for all speeds, since low deceleration does not lead to warning with a relatively high intensity. On the other hand the disadvantage of this embodiment is that the pauses have to be limited to a duration of approximately 3 seconds at the most, during which there is in fact no warning. This is more particularly the case in crawling and city traffic and less so in traffic moving at speed, since in this case at a low intensity more time is available. There is consequently only a range of regulation of 1:2 before light phases and pauses of equal durations of respectively 1 second are reached.

Figure 3:
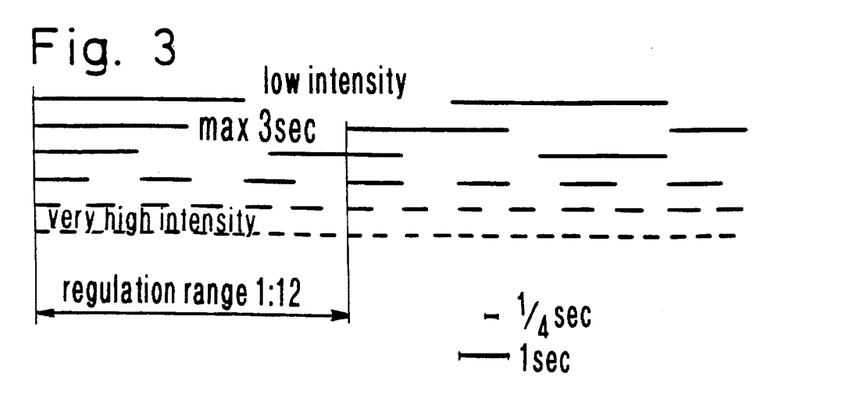
FIG. 3 shows a blinking profile with long light phases and pauses and with an increasing frequency.

In the case of a third embodiment of the invention, which is depicted in FIG. 3, the light phases and the pauses are always equal or approximately equal in length and with an increase in danger they become shorter and shorter so that the frequency correspondingly increases. This leads to the advantage that in the case of light and dark phases of equal duration the physiological effect of the increase in frequency is more pronounced than if the frequency is merely increased by shortening light or dark phases. This is more especially significant when there are high overall danger factors. Furthermore this embodiment of the invention has the advantage of an extremely large regulation range of approximately 1:12, if pauses of at the most 3 seconds are employed to begin with and are increased up to a frequency of 2 per second. This is readily put into practice using LED's, since they reach their full luminous power even within approximately 0.1 sec and furthermore turn off very rapidly. From physiological point of view a rate of half a second as such attracts attention to a considerable extent; a limited increase in frequency is still practically possible.

Figure 4:
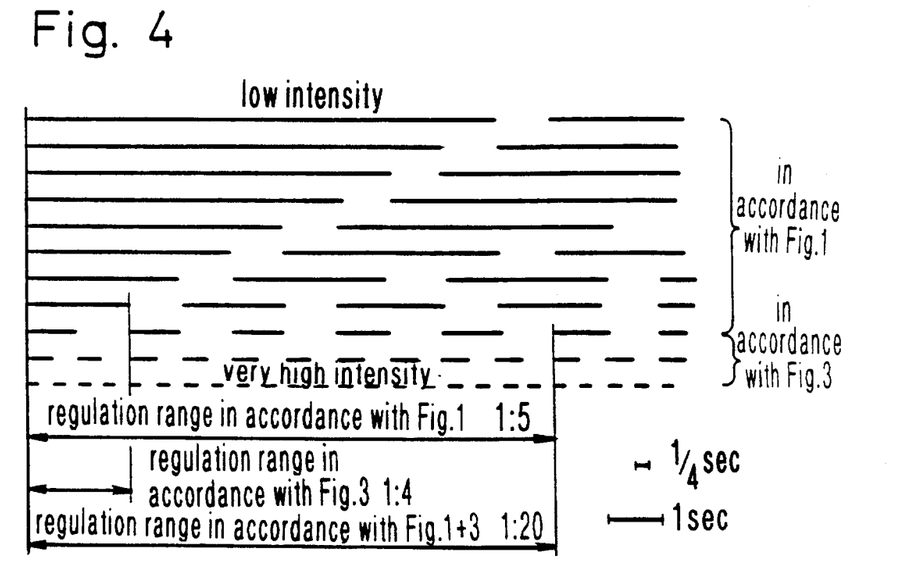
FIG. 4 shows combinations occurring one after the other in time of the profiles in accordance with FIGS. 1 and 3.

A fourth embodiment of the invention uses a combination of the second and the third designs and is illustrated in FIG. 4. In this case the increase in the intensity takes place in the range of low to medium overall danger factors in accordance with system of the first embodiment with light phases which become shorter and shorter. As soon as the light and the dark times are equal, at for instance 1 second each, for a further increase of the overall danger factor they become shorter in accordance with the system of the third embodiment, that is to say at the same rate for the light and dark phases. The further increase in frequency is then, as mentioned above, only limited technically and physiologically and at a frequency of 3 to 4 per second will have reached its maximum intensity. The advantage of this embodiment is more especially that it renders possible the advantages of the first and third embodiments combined with a range of regulation of approximately 1:20.

Figure 5:
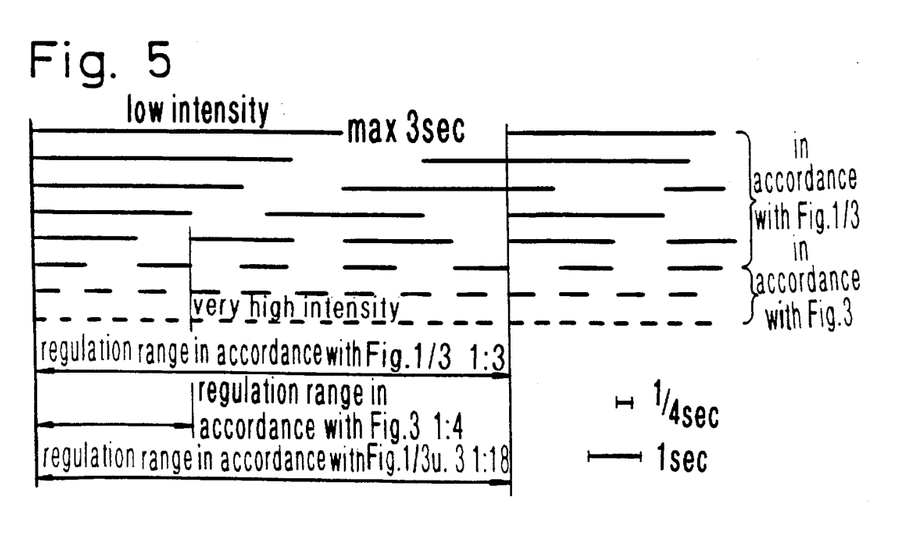
FIG. 5 shows a further profile in the form of a different combination.

FIG. 5 shows a further embodiment, i.e. in a range of low intensity as a intermediate design between the first and third embodiments with for instance ⅔ light phase and ⅓ dark phase with a maximum duration of 3 secs. On attaining a dark phase of 1 sec in duration there is then a transition to the third embodiment with equal light and dark phases. In this case as well there is a large range of variation.

In the case of another advantageous further development of the invention the warning commences with a light phase in every case as is depicted in figures, as is furthermore illustrated in FIGS. 1 and 5 as well, as soon as the threshold danger factor is gone below. The advantage resides in the immediate production of a warning when danger arises, something which is not the case if the warning starts with a pause.

In practice the useful range of regulation for a warning light blinking with a variable rhythm is limited by the fact that it is hardly possible to go below a blink frequency of around 1 to 1.5 in the case of incandescent lamps and 2 to 3 per second in the case of LED's. Furthermore a decrease in the frequency below ⅒ per second or an increase in the pauses to much more than 3 seconds will increasingly lead to a loss of any reasonable warning effect. The resulting range of variation is, as explained for the first and third embodiments, at 1:2 to 1:12 and in the case of combinations it is 1:20. Nevertheless even a substantially wider range of regulation or variation is necessary for the intensity in order to ensure that for low overall danger factors in crawling traffic the intensity of warning is still sufficient, whereas nevertheless an increase in the maximum warning effect or stage is still possible after of emergency braking or a rear end collision on the Autobahn. The last preceding table herein indicates that there is a ratio of 1:5000 between the minimum necessary danger factor of 1 (at $v_o$ equal to 1 m/sec and b equal to 1 m/sec$^2$) and the maximum factor with a rear end collision (at $v_o$ equal to 60 m/sec and b equal to 8 m/sec$^2$). It will be clear from this that the regulation of intensity simply by the blink frequency alone is by no means sufficient. (As regards the table it is to be explained that the subsequent warning time in seconds is take to be equal to the numerical value of the overall danger factor).

In accordance with the invention this object is attained since the brightness of the deceleration warning light is set to be dependent on the overall danger factor. Here as well a lower limit is set, below which in practice no warning is produced, since such warning is only produced at all by suddenly switching on a light. The brightness may however be increased to a very considerable degree as well in the case of high overall danger factors, since in the case of an extreme danger a certain dazzling effect can be accepted in order to get an improved warning. A range of regulation of 1:10, and possibly far more, may be accepted as realistic. If this is multiplied by the range of regulation of the blink frequency of for example 1:20, we will have a range of regulation of 1:200, which is admittedly useful but is still to be improved.

A further improvement in accordance with the invention results from the size of the lighted surface or area. By a selection of the number of incandescent lamps or of LED's the area may be varied to a substantial degree; with incandescent lamps for instance without difficulties within a range of 1:10 and with LED's for instance in a range of 1:100.

From this as a whole by multiplication by the above mentioned range of 1:200 there is an overall range of 1:2000 to 1:20000. In this respect it is not absolutely necessary for the same to be controlled steplessly or in small steps, even although this would be possible technically without difficulty. It is very much more important for an increase to be possible to a warning of maximum intensity despite there being a low intensity when there is only a small degree of danger. From the last column of the said above table it will be seen that in the case of rear end collisions involving high speeds there may be overall danger factors of for instance 25,000. In the case of the design in accordance with the invention it is furthermore to be taken into account that the physiological perception for optical events is to a significant degree logarithmic so that for example a 20-fold increase in luminous power would not be experienced as a 20-fold increase in brightness and consequently also the sensitivity to light of the human eye covers a range of regulation of approximately 1:10,000.

The invention contemplates a further increase in brightness regulation in a manner dependent on ambient brightness. This offers the advantage that in sunlight the warning lamps will be well clearly visible even at a low power stage, whereas during the night, apart from the case of emergency braking and rear end collisions, there will be no dazzle.

A still further possible improvement in the warning system in accordance with the invention contemplates such an arrangement and design of the deceleration warning lights that confusion with tail lights or blinking lights for indicating direction are is prevented. Basically the warning effect caused by braking or decelerating is much more important than an indication of the change in direction intended, since deceleration as a rule takes place without taking into account the following traffic and without notice and furthermore it represents a direct increase in danger by the production of a speed difference. Furthermore on the contrary an indication of a change in direction is more or less of an informative character, although however there is a certain warning function preceding a possible braking operation. Furthermore, unlike the case of a braking operation, a change in direction may only take place, if consequently a following vehicle is not put jeopardy or is forced to react. The turning of a preceding vehicle moving at the same speed is completely without danger if it takes place without an braking operation (for instance on a branch Autobahn). Although the warning of deceleration is much more important for the following vehicle than the indication of a change in direction, confusion thereof should be avoided, this being increasingly necessary with an increase in the intensity of the deceleration warning.

Figure 6A:
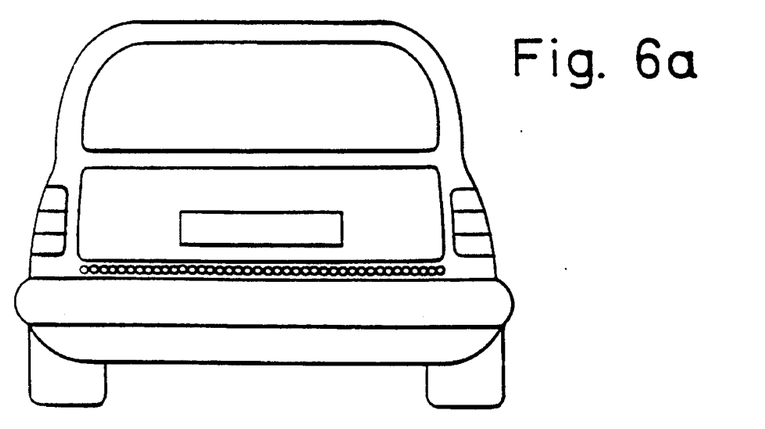
FIG. 6a shows an arrangement of a plurality of deceleration lights, which is arranged as a strip of lights between the bumper and the trunk lid.
Figure 6B:
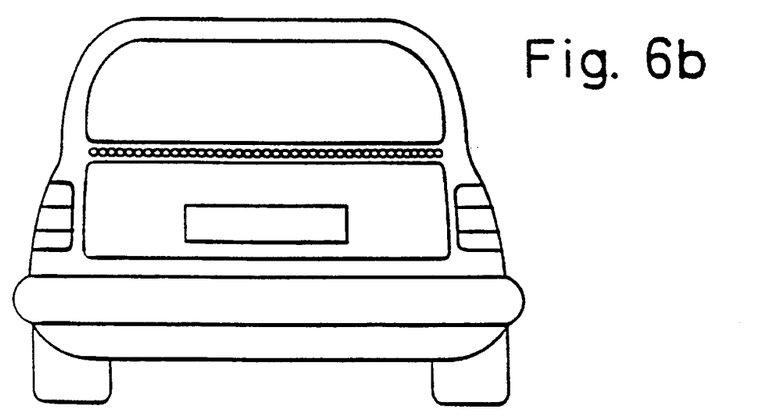
FIG. 6b shows a strip of lights arranged on the lower edge of the rear window.
Figure 6C:
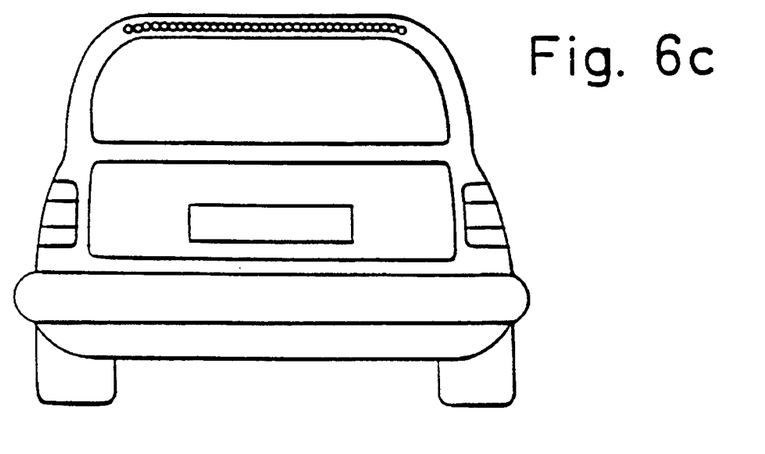
FIG. 6c shows a strip of lights arranged over the rear window.
Figure 7A:
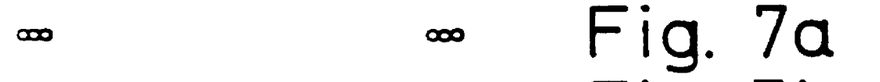
FIGS. 7a through 7f show the blinking parts of two light strips during low intensity warning (FIG. 7a) in a plurality of stage up to a high intensity of warning (FIG. 7f).
Figure 7B:
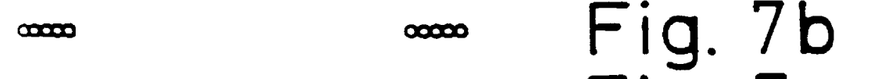
Figure 7C:
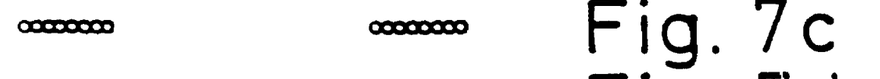
Figure 7D:
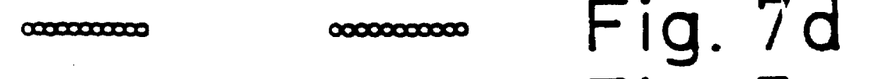
Figure 7E:
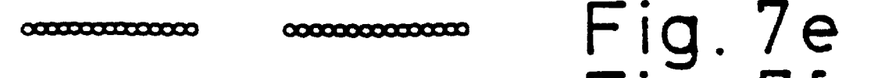
Figure 7F:
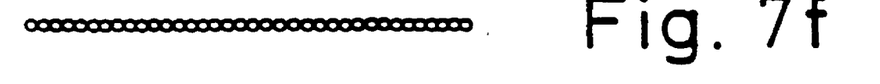

The solution to this problem presented by the present invention is that the deceleration warning lights are not—as customary at the present day—integrated in the two rear light fittings to give a pleasing three-dimensional structure, but are rather mounted in the form of two separately arranged light strips. In accordance with the suggestion for providing a larger luminous area with an increase in danger, it is also possible to increase the length of the two light strips. Using small incandescent lamps and however more particularly using LED's this is possible in a compact fashion in accordance with FIG. 6a, for instance between the bumper and the lower edge of the trunk lid, in accordance with FIG. 6b on the lower edge of the rear window or in accordance with FIG. 6c at the top edge thereof. In the case of low overall danger factors only the outer parts of the light strips blink; in the case of higher overall danger factors they become longer towards the middle of the vehicle and in the case of maximum overall danger factors they join at the middle of the vehicle, as depicted in FIGS. 7a to 7f. Owing to separation in space from the remaining lights and owing to the strip configuration the danger of confusion with a direction indicator light is reduced in accordance with an increase in the overall danger factor and with a consequent increase in the length of the blinking parts. The light strips furthermore offer the advantage that the intensity of the warning is signalized in a clear manner and that, particularly in the high intensity condition, they have a optical and physiological barrier or wall effect.

Further advantageous developments and convenient forms of the invention have already been described in the preceding description.

I claim:

1. A deceleration warning system for reduction in danger of rear end collisions in road traffic or in connection with other movements of objects, said warning system comprising two or more deceleration warning lights in a decelerating vehicle which are intermittently turned on, wherein an intensity of a warning produced by the deceleration warning lights of the decelerating vehicle is dependent on a level of a danger factor G which originates from the decelerating vehicle and which is seen by following vehicles; wherein said deceleration warning system responds when a deceleration of the decelerating vehicle exceeds a selected deceleration value and the danger factor is an overall danger factor $\Sigma G$ which is dependent on a level of an instantaneous or preceding level of a deceleration b of the decelerating vehicle; and wherein the overall danger factor $\Sigma G$ is dependent on duration t or a deceleration distance s of a preceding deceleration b of the decelerating vehicle.

2. The deceleration warning system as claimed in claim 1, wherein the overall danger factor $\Sigma G$ is dependent on the deceleration b of the decelerating vehicle and the time t or the deceleration distance s as a product b x t or b x s, which is ascertained as an integral of varying deceleration b of the decelerating vehicle over a period of time t or along a deceleration distance s, according to the following formulae:

$$\Sigma G = \int_0^t b\,dt \text{ or } \Sigma G = \int_0^s b\,ds.$$

3. The deceleration warning system as claimed in claim 2, wherein the overall danger factor is ascertained according to the following formulae:

$$\Sigma G = \int_0^t b^2 dt \text{ or } \Sigma G = \int_0^s b^2 ds.$$

4. The deceleration warning system as claimed in claim 2, wherein a level of speed at which the decelerating vehicle is moving prior to deceleration caused by braking, $V_o$, is taken into account and the overall danger factor is ascertained according to the following formulae:

$$\Sigma G = v_o^2 + \int_0^t b\,dt \text{ or } \Sigma G = v_o^2 \times \int_0^s b\,ds$$

5. The deceleration warning system as claimed in claim 1, wherein, during a response of an anti-wheel lock system of the decelerating vehicle, a limitation of hydraulic brake pressure is taken into account in ascertaining the overall danger factor.

6. The deceleration warning system as claimed in claim in claim 1, further comprising a proximity radar unit or an ultrasonic distance warning device mounted on a rear of the decelerating vehicle for measuring a distance from a following vehicle.

7. The deceleration warning system as claimed in claim 1, wherein the overall danger factor is increased and updated by a continuous recording, by integration and by storage of new, additional partial danger factors $\Delta G$.

8. The deceleration warning system as claimed in claim 1, wherein the overall danger factor is decreased and updated by an integration of negative partial danger factors $-\Delta G$.

9. The deceleration warning system as claimed in claim 8, wherein storage of negative overall danger factors is suppressed.

10. The deceleration warning system as claimed in claim 8, wherein cancellation of the stored overall danger factor takes place based on elapse of time.

11. The deceleration warning system as claimed in claim 10, wherein the cancellation takes place in accordance with time or is dependent on a respective residual danger factor.

12. The deceleration warning system as claimed in claim 11, wherein the cancellation is interrupted at a certain stored residual danger factor.

13. The deceleration warning system as claimed in claim 10, wherein the cancellation is interrupted dependent on a speed of the decelerating vehicle or an operation of an anti-wheel lock system of the decelerating vehicle at a certain stored residual danger factor.

14. The deceleration warning system as claimed in claim 10, wherein the cancellation is interrupted dependent on a certain speed-related minimum distance of the decelerating vehicle from a following vehicle.

15. The deceleration warning system as claimed in claim 10, wherein the cancellation is interrupted continuously on storage of positive partial danger factors $\Delta G$.

16. The deceleration warning system as claimed in claim 1, wherein the warning is produced responsive to a rearwardly directed proximity radar unit and is dependent on a minimum distance from a following vehicle from the decelerating vehicle.

17. The deceleration warning system as claimed in claim 1, wherein a deceleration warning light produces light phases of unequal duration with short constant dark phases therebetween, said light phases being shorter when there is an increase in the danger factor.

18. The deceleration warning system as claimed in claim 1, wherein the deceleration warning light produces light phases of constant duration with shorter unequal dark phases therebetween, said dark phases being shorter when there is an increase in the danger factor.

19. The deceleration warning system as claimed in claim 1, wherein a deceleration warning light produces light phases of constant duration with dark phases of equal duration therebetween, which dark phases being shorter when there is an increase in the danger factor.

20. The deceleration warning system as claimed in claim 1, wherein the intensity of a deceleration warning light increases with an increase in the danger factor.

21. The deceleration warning system as claimed in claim 1, wherein a number of turned on deceleration warning lights or an effective surface area thereof increases with an increase in the danger factor.

22. The deceleration warning system as claimed in claim 1, wherein a number of turned on deceleration warning lights are arranged in strip arrays, and a turned on length thereof increases with an increase in the danger factor.

23. The deceleration warning system as claimed in claim 1, wherein a brightness of a deceleration warning light depends on ambient light brightness.

* * * * *